United States Patent
Pettingell et al.

(10) Patent No.: US 6,449,088 B1
(45) Date of Patent: Sep. 10, 2002

(54) VARIABLE DARKFIELD ILLUMINATION SYSTEM FOR MICRO AND MACRO OPTICAL IMAGERS

(75) Inventors: James T. Pettingell, Escondido; James T. Snyder, Poway, both of CA (US)

(73) Assignee: EmCal, San Diego, CA (US)

( * ) Notice: Subject to any disclaimer, the term of this patent is extended or adjusted under 35 U.S.C. 154(b) by 0 days.

(21) Appl. No.: 08/147,793

(22) Filed: Nov. 5, 1993

(51) Int. Cl.⁷ .............................................. G02B 21/00
(52) U.S. Cl. ....................... 359/386; 359/371; 359/380; 359/381; 359/385
(58) Field of Search .................. 359/371, 380, 359/381, 385, 386, 392, 368, 370, 383, 37, 483; 362/19

(56) References Cited

U.S. PATENT DOCUMENTS

| | | | |
|---|---|---|---|
| 2,594,758 A | * 4/1952 | Fischer ........................ 359/386 |
| 3,567,309 A | 3/1971 | Jasgur ......................... 359/386 |
| 3,572,885 A | 3/1971 | Reinheimer ................. 359/381 |
| 3,822,926 A | 7/1974 | Dalbera et al. ............. 359/386 |
| 4,386,830 A | 6/1983 | Stankewitz et al. ......... 359/369 |
| 4,515,445 A | 5/1985 | Müller et al. ............... 359/386 |
| 4,634,240 A | * 1/1987 | Suzuki et al. ............... 359/386 |
| 4,906,083 A | 3/1990 | Sattler ......................... 359/386 |
| 4,927,254 A | * 5/1990 | Kino et al. .................. 359/368 |
| 4,953,188 A | * 8/1990 | Siegel et al. ................ 359/370 |
| 5,132,526 A | * 7/1992 | Iwasaki ....................... 359/368 |

OTHER PUBLICATIONS

Close–Up Photography in Practice, by Axel Brück, Published on 1984 pp 90–91.
The Close–up Photography, Heather Angel, Alfred A. Knopf, Not Dated.

* cited by examiner

*Primary Examiner*—Mohammad Sikder
(74) *Attorney, Agent, or Firm*—Page Lohr (57) ABSTRACT

A variable dark-field illumination method and apparatus to produce microscopic and macroscopic images with a variable dark-field effect thereby making best use of various detector response characteristics. The variable dark-field of the invention is particularly characterized by an adjustable object contrast which optimizes the use of the various detectors dynamic range. The invention is particularly useful when coupled with a video camera and for macroscopic systems having a large depth object field. The dark-fields of the art have geometries which are objectionable because those geometries have very limited depths of field. The invention is particularly distinguished from the art as the dark-field methods and apparatuses of the art are generally geometrically restrictive and they do not provide variable contrast control for input images.

7 Claims, 12 Drawing Sheets

VARIABLE DARKFIELD ILLUMINATION SYSTEM FOR MICRO AND MACRO OPTICAL IMAGERS

BACKGROUND OF THE INVENTION

The present invention is generally related to illumination for imaging systems and is specifically related to dark-field illumination for microscopic and macroscopic imaging systems.

For the present invention, imaging systems for small objects including microscopes and macroscopic imagers, are of particular interest. Generally, microscopic systems have a magnification between 10 and 1000 where the magnification is defined by the ratio of the image size compared to the object size in linear dimension. Macroscopic systems can have images that are magnified between 0.3 and 10 times. Although a "magnification" value less than 1 is really a reduction where the image produced is smaller than the object thereof, we still use the word "magnification". The present invention can be employed on both systems with some benefits being particular to macroscopic systems.

Figure 1:
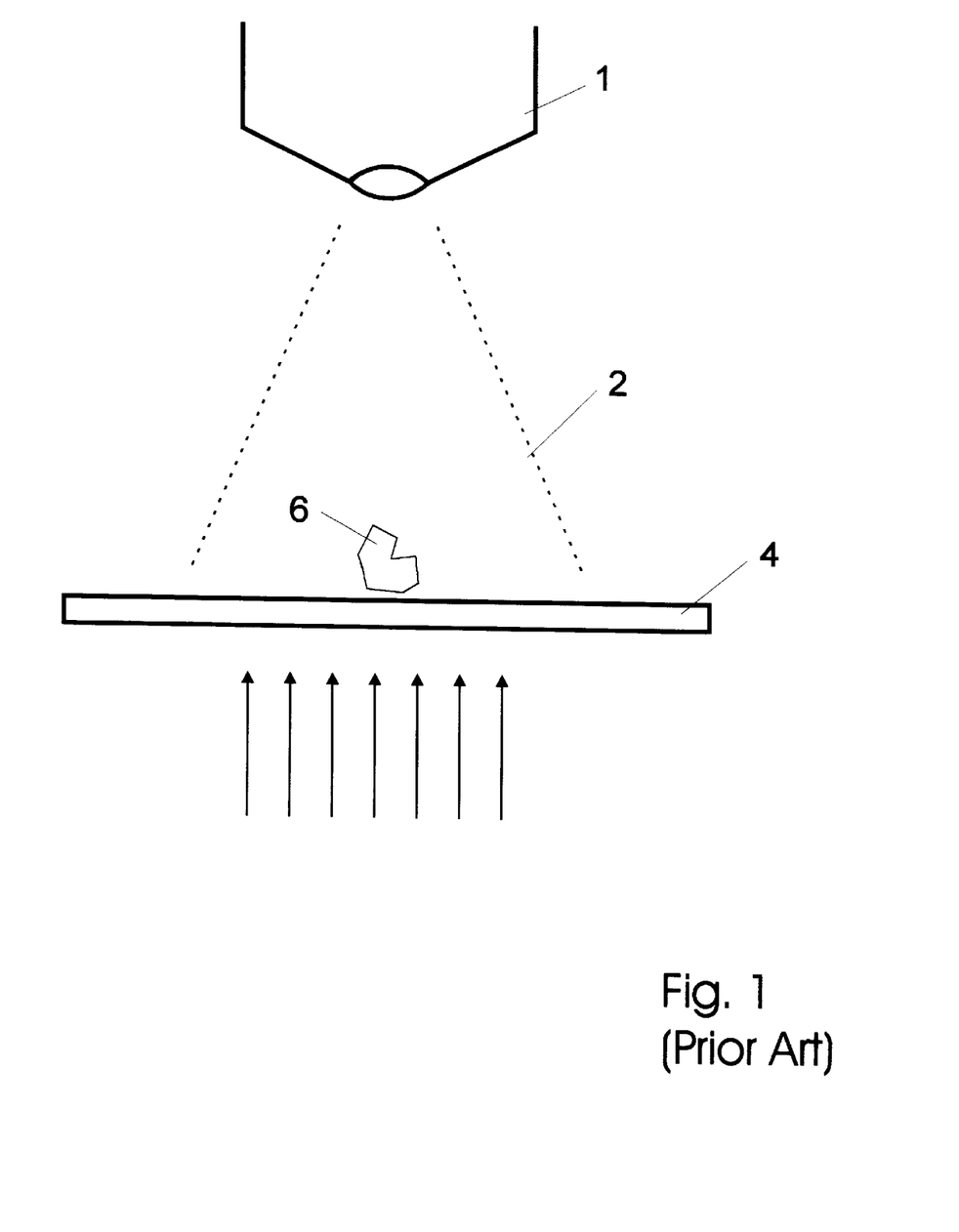

The orientation of an illumination source of an imaging system can dictate the way that the object being viewed will appear to a viewer. Generally, an object is viewed in either of two common configurations. A first is known as "bright-field" illumination where the image background is bright and features of the object being viewed are dark. Bright-field illumination is particularly useful for translucent type objects. The effect is achieved by backlighting the object as is shown in prior art drawing FIG. 1. A second illumination configuration produces an image known as a "dark-field" image. An object 6 resting on a support 4 can be illuminated with light from a light source 7 and reflector 5 that is outside the field-of-view 2 of the imaging optics 1. Light 9 reflected from the object features then can enter the pupil of the imaging optics 1 to form an image where the features of the object are light and the image background is dark as the illumination source can not be seen by the imaging system.

There are several ways to provide for illumination sources that produce a dark-field image. The most common is to arrange the illumination source to shine light onto the object from the side in a direction that is transverse with respect to the optical axis of the system. Any light from the source that does not get reflected from the object will continue to propagate past the object but will not enter the pupil of the imaging optics as is shown in the prior art drawing of FIG. 2. In this way, only light from the object will enter the imaging optics and form a bright image of the object features against a dark background. A problem with this system is that the light that is scattered from the object must be scattered at a large angle in order to enter the imaging optics. The efficiency of high angle scattering is low. For light sufficient in quantity to form a usable image to be scattered by an object at a large angles requires that the source be very bright. Bright sources in microscopes are undesirable because of heat and other problems.

Alternatively, it is possible to arrange a light source to illuminate the object from a direction that forms an acute angle with, the system's optic axis. An example in the art that is noted in the U.S. Pat. No. 4,906,083, suggests that a central zone of the field-of-view be blocked such that the illumination source can not be viewed directly by the imaging optics. In this case, slight changes in the propagation angle of light rays from interaction with the object will divert those rays into the pupil of the imaging optics. This is illustrated in prior art drawing FIG. 3 where a light stop 8 is placed between the microscope objective lens and the source so that light from the source can not pass into the imaging optics without first being reflected from the object. Light rays 3 that are propagating in a direction that would cause them to enter the pupil of the imaging optics are blocked. Light rays being reflected only slightly at the object 6 can enter the imaging optics to form an image. If light ray 9 did not interact with the object, its path would lead to a point outside the entrance pupil of the objective lens 1. In this way, very slight reflections from the object will be coupled to the image beam. Alternatively, light rays can interact with features 19 that are inside of a translucent object and thereby contribute to the object beam. For objects such as gems where the surface quality is of concern, this method may be very useful.

Figure 2:
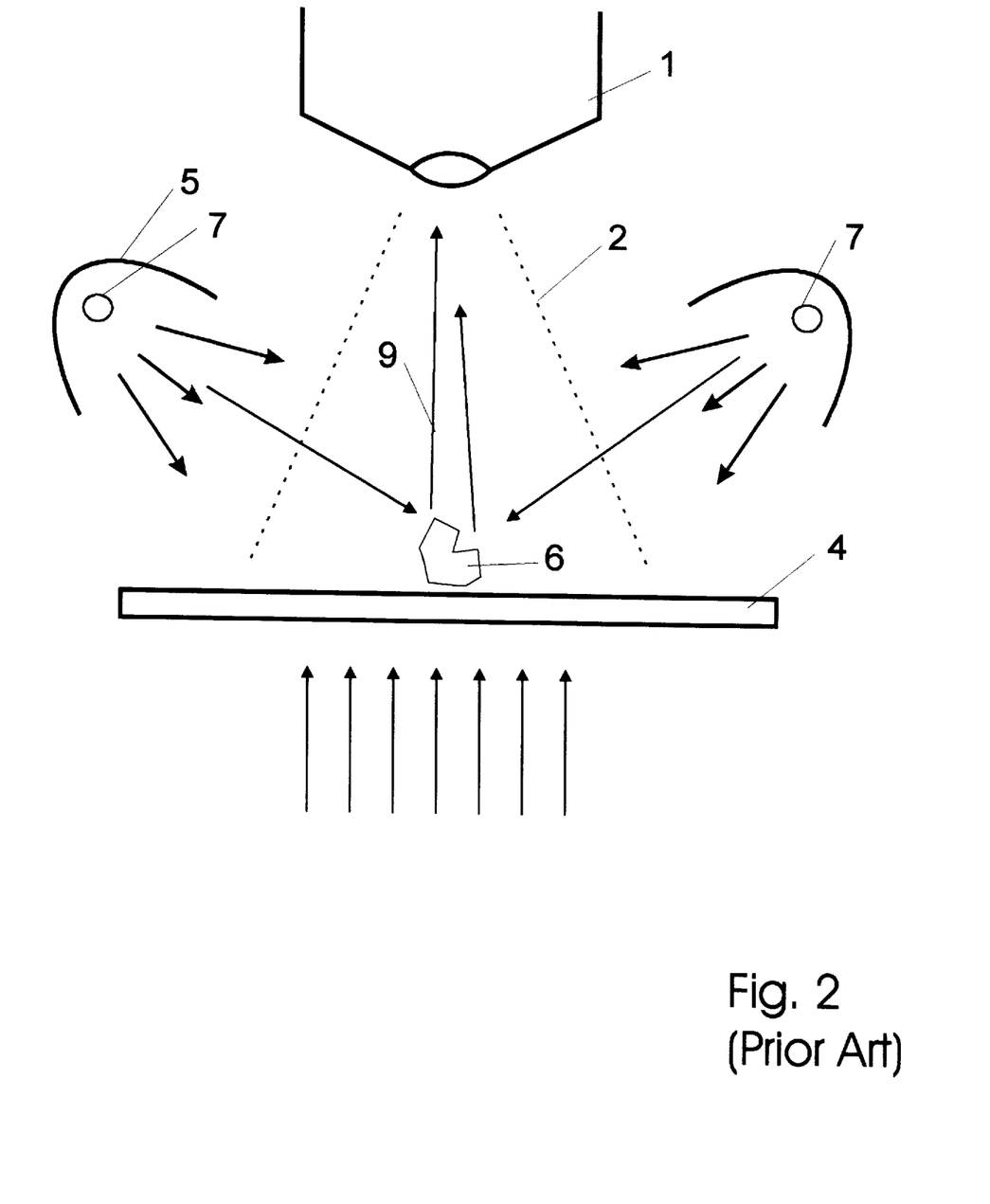

A major problem with the arrangement of FIG. 2 is that strong glare generated at smooth flat surfaces can hide fine image features. It is the subject matter of Jasqur that addresses the reduction of this surface glare. "Forward scattering" where the change in the angle of propagation is small, is efficient with respect to the quantity of light in the scattered beam. Unfortunately, this can be a disadvantage when looking at objects that may have interesting features that can be hidden by the large amounts of surface scattered light. If one is not interested in viewing a surface of the object but detailed features thereon, the surface scattered light can hide those details. The illumination system of FIG. 1 could be preferred to see the features of a surface; the system of FIG. 2 may be preferred for seeing surfaces. Glare is generated in reflections from a smooth surface. The tendency is for light to become linearly polarized in a direction that is parallel to the surface that reflects the light. This is a result of the Fresnel equations and the bias-of a surface to more strongly reflect light that has its polarization along the plane of the reflecting surface. If the subtle features of an object reflect light in small amounts, the strong light reflected from a nearby surface, the glare, can overwhelm the imaging of those features. To eliminate the glare, one could discriminate against the light that tends to take the polarization of the surface with a polarizing filter or analyzer. It is an oversight of Jasgur in lines 48–51 of the first column to suggest that the two polarizers simple must be crossed to eliminate the glare. It is not enough to simply cross polarizers to reduce the glare from a surface.

A designer can produce many variations of light source arrangements that avoid shining source light directly into the pupil of the imaging optics. In all cases of the prior art, a geometrical arrangement is used whereby the light from the source propagates in a direction such that it will not enter the pupil of the imaging optics. Although dark-field illumination methods are known in microscopic imaging arts, the methods of attaining a dark-field have been problematic as the quality of the dark-field has been limited and the complexity of the optical arrangements required have been undesirable and have resulted in secondary problems such as glare. The use of polarizing microscopes to produce a dark-field image may have been attempted, but the results are inferior to the oblique illumination methods. Because microscopes in general require very bright sources, the use of polarization techniques which require even brighter sources as fifty percent of the light can be lost at a first polarizer, the prior art teaches away from the use of polarization techniques for dark-field illumination systems. Currently, the use of the oblique method is the preferred method in the art.

The use of other optical elements and devices in the optical paths of microscopic systems have been practiced in the arts. Particularly, the use of cameras and polarizers are common. A camera coupled to the system can provide the user relief from the concentration associated with looking into a microscope eyepiece. Cameras are also useful for recording image features for study at a later time or for publishing purposes. As the eyepiece of a microscope is generally designed for a single viewer, a camera is useful for group viewing. Both still photographic type cameras and electronic video cameras are currently in widespread use in conjunction with microscope systems.

Polarizing elements can be used to serve many functions in microscope imaging techniques. Polarizing microscopes use polarizers to look at anisotrophic materials, remove glare, control illumination intensity, multiplex illumination beams of various colors or other properties, and other special effects.

In U.S. patent prior art class/subclass 359/386 we find the illumination systems for microscopes that use polarized light. In U.S. Pat. No. 3,567,309, inventor Jasgur teaches the use of polarizers to limit glare. The detailed description shows where Jasgur has left a very important omission that results in a great improvement in removal of the glare generated at surface reflections from optical element surfaces. U.S. Pat. No. 4,515,445 provides for an improvement in image contrast by a double pass through the object. In lines 41–44 of column 3, we learn that polarizers can be used in the path of the illumination system to suppress reflections. This may be the most common use of the polarizers in an optical system and is important in microscopy where reflections can otherwise hide very subtle features.

In lines 34–37 column 1, U.S. Pat. No. 4,906,083 authors Spencer and Frank remind us that: "dark-field illumination is used, in which the object is illuminated from the side or the central zone of the light beam is screened out." The subject of the patent is directed at a dark-field illumination system using polarization means. As this is the very object of the present invention, it is advised that the reader becomes familiar with the above referenced patent ending in '083. The inventor discovered that a dark-field could be provided with a very bright source and provided a novel means to deliver the light to the system. Messrs. Reinheimer and Klein present an arrangement in U.S. Pat. No. 3,572,885 which includes a Bertrand lens. The disclosure of U.S. Pat. No. 4,634,240 is especially important with respect to the present invention in that it employs the combination of a video camera in conjunction with a polarizing means to control illumination. It will be understood from the detailed description that it is also the intention of this invention to control illumination with a similar combination. The present invention distinguishes itself from the invention of Suzuki in that the polarizer is used to control the quantity of light that enters the camera or for an exposure control means. The polarizers of the invention are used to discriminate against light having a certain property and does not act uniformly on the entire beam as the polarizers of the Suzuki invention do. An incident light, bright-field Kohler device described in Stankewitz et al, U.S. Pat. No. 4,386,830, provides illumination for microscopes with polarized light. Finally, Dalbera in U.S. Pat. No. 3,822,926 teaches a particularly clever means to correct the "Maltese cross" known to appear in systems using polarizers. The invention of Dalbera will improve the effectiveness of many systems that employ polarizers.

Although we find considerable work in the field, the inventions of the art do not and can not provide the advantages found in the current invention. The current invention provides for a variable dark-field illumination system using polarizers in combination with a camera.

While the systems and inventions of the current art are designed to achieve particular goals and objectives, some of those being no less than remarkable, these inventions have limitations and faults that prevent their use to achieve the benefits herein described. The inventions of the art do not, and can not, be used to realize the advantages and objectives of the present invention.

SUMMARY OF THE INVENTION

Comes now, an invention of a variable dark-field illumination system for micro and macro optical imagers including devices and methods.

A fundamental difference between the illumination systems of the invention and that of the prior art can be found in the use of new geometries of optical elements which produce the variable dark-field effect. The systems of the invention are particularly characterized in that the light from the light source propagates in a direction that is substantially parallel to the optical axis of the imaging system. Previous dark-field illumination systems require geometric arrangements of the light source such that the light would not propagate in a direction that would enable it to pass into the pupil of the imaging optics or require prohibitively bright sources. In the system of the invention, light from the source that is propagating directly toward the pupil can be stopped at a polarization analyzer if that light has not interacted with the object being viewed. These new geometries can include dark-field object space of infinite depth which is particularly useful in macroscopic imaging systems which can have object depths that are far greater than the depths that are found in microscopic systems. This large depth dark-field of the invention can allow unique optical arrangements of other optic elements that may be limited by systems of the art. Methods of the art generally used certain geometric arrangements of illumination sources to prevent light from the illumination source from directly entering the pupil of the imaging optics.

It is also a fundamental difference of the present invention compared to the prior art to provide the possibility of a variable dark-field. A variable dark-field effectively allows one to adjust the light levels of the light emanating from the object before the light enters the imaging optics such that the contrast range of the object's interesting features can be optimized with respect the range in which the detector is linearly sensitive thus giving maximum contrast at the final image. The prior art is limited to a dark-field which has a dark level that is not adjustable. The illumination source geometry is generally fixed in a way that prevents one from adjusting the level of the darkest object features without changing the brightest image features. A variable dark-field can be used to match the image signal contrast to the dynamic range of a detector thereby providing the highest possible contrast in a final image. The detector can be a human eye, photographic film, or electronic type cameras such as CCD cameras; each having a different dynamic range.

The present invention provide a more complete solution to a problem which was recognized in the art, specifically, in U.S. Pat. No. 4,906,083 where the solution proposed is a stronger light source. Simply increasing the strength of the illumination source will adjust the intensity bias but has no effect on the image signal contrast. The inventors noticed the phenomenon when experimenting with a particular detector and a new illumination scheme. By using a video camera designed for low light conditions, it was found that a great improvement in final image contrast could be attained with a variable dark-field as opposed to the absolute dark-field of the art. This was due to the subtle transitions from the linear to non-linear regions of the response curve of the human eye where the effect is not so strong. Nature has provided the eye with a very sophisticated image processing system that tends to adjust the dynamic range of the eye to match the object being viewed, thus hiding the effect from most observers. Without the benefit of the low light level camera 14 where the new effect is more clearly observed, the effect has remained hidden. Users of microscopes equipped with polarizers have manipulated light sources and the light from the object to produce many effects that are useful, however, until the inventor applied the variable dark-field method to a video camera detector, the usefulness of a variable dark-field could not be recognized with devices of the art.

Accordingly, it is a primary object of the invention to provide an illumination system for micro and macro imaging systems. It is also an object of the invention to provide a system of variable dark-field illumination for micro and macro imaging systems. It is an object of the invention to provide an improved means of viewing macroscopic objects as a result of the new geometrical arrangement of optical elements including lenses, light sources, polarizers, objects, video cameras and others. It is a further object of the invention to provide a new and novel system to remove the illumination source from the field-of-view of a microscope.

A better understanding can be had with reference to the detailed description of preferred embodiments and with reference to the appended drawings. These embodiments represent particular ways to realize the invention and are not inclusive of all ways possible to benefit from the invention. Therefore, there may exist embodiments that do not deviate from the scope of this disclosure as set forth by the claims, but do not appear here as specific examples.

BRIEF DESCRIPTION OF THE DRAWING FIGURES

These and other features, aspects, and advantages of the present invention will become better understood with regard to the following description, appended claims and drawings where:

figure one is a prior art drawing where the illumination system produces a bright-field image;

figure two is a second drawing of the prior art where a second geometric arrangement is used to produce a dark-field illumination;

figure three is a third drawing of the prior art where a geometric arrangement produces a dark-field with oblique illumination;

figure four is a drawing of one aspect of the invention where light from a source passes into the pupil aperture of the objective after interacting with an object;

figure five is an optical schematic of a system to produce a dark-field illumination for micro or macro optical imagers;

figure six is a graphic of a detector response curve between the image signal and an arbitrary detector;

figure seven is a graphic of the detector response curve which has insufficient image signal contrast;

figure eight shows the detector response curve with image intensity distortion from an over biased image signal the result of simply increasing the source intensity;

figures nine and ten are illustrations of an apparent contrast improvement observed in the art;

figures ten and eleven are illustrations of adjusting the object contrast to match the detector dynamic range.

figure twelve illustrates the 'matched'condition.

DETAILED DESCRIPTION OF THE PREFERRED EMBODIMENTS OF THE INVENTION

Preferred Geometry

Figure 3:
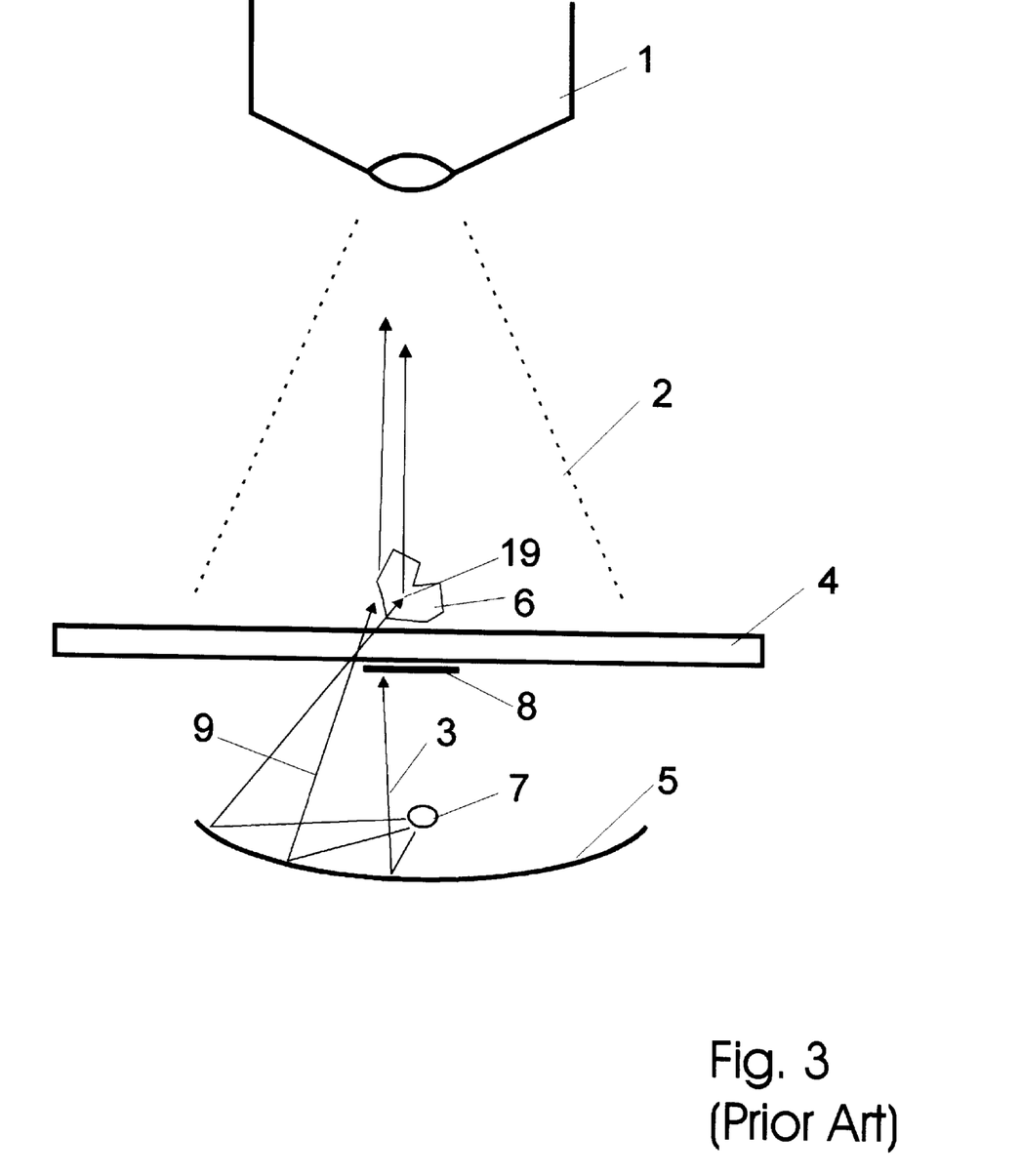

The dark-field systems of the prior art have relied on a geometrical separation of the illumination source from the imaging optics' aperture pupil. The opaque field stop 8 in FIG. 3 provides a shadow volume (usually a conic section) which prevents light from entering the imaging optics'aperture pupil. The light that illuminates the object is generally propagating at an acute angle with respect to the optic axis. This type of arrangement is useful for high magnification systems where the depth of the field of interest is small and is not appreciable in size with respect to the dimensions of the shadow volume. In macroscopic systems however, the depth of the field of interest may be large. An illumination arrangement providing a dark-field in one plane may not be effective in another plane as the field-of-view may begin to "see" the illumination source.

Figure 4:
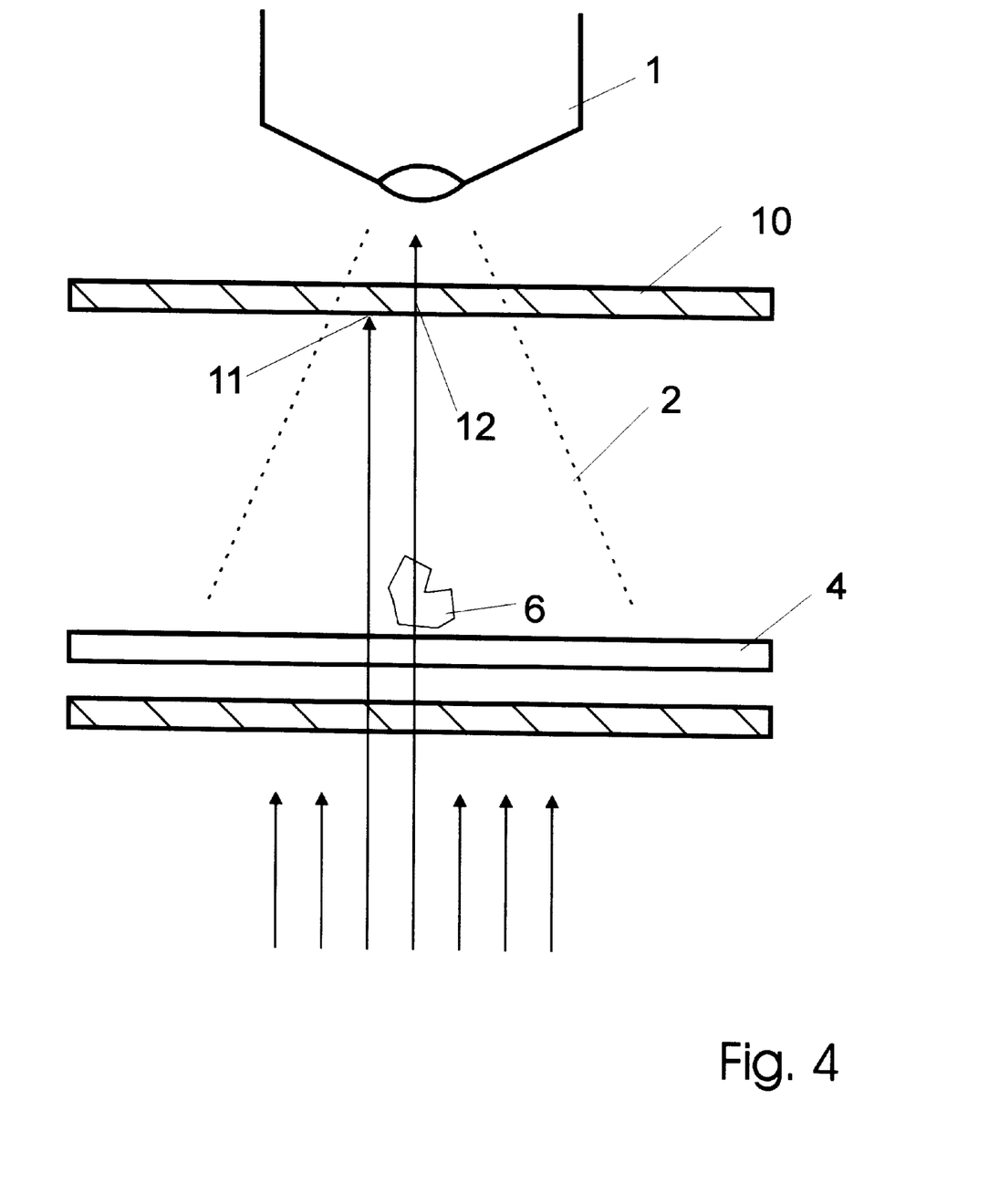
Figure 5:
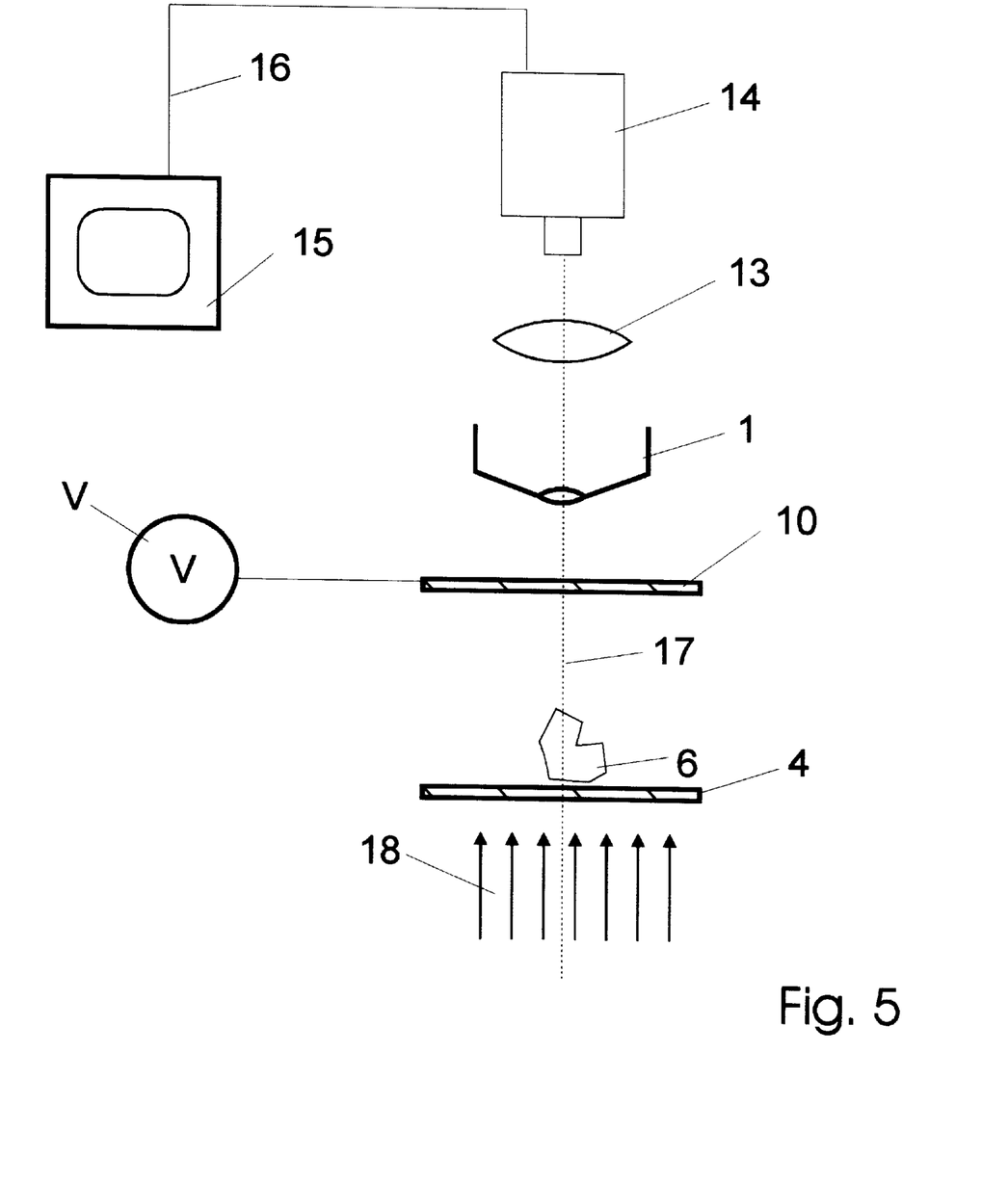

Preferred versions of the invention separate the light from the source 18 from the imaging optics 1, 13, 14, without geometrically removing the illumination source from the field-of-view of the imaging optics. The light from the light source propagates along the optical axis 17 in a direction toward the pupil aperture. The illumination source light that has not interacted with an object in the object volume of the system is blocked from the pupil by way of polarization techniques an in particular at a polarization analyzer. Source light is not allowed into the imaging system without having first interacted with the object being viewed. Linearly polarized light from the illumination source propagates along and parallel to the optic axis 17 toward the imaging optics pupil. Rays 11 that do not interact with the object maintain their polarization state and can be extinguished at a polarization analyzer 10. A polarization analyzer may be either of several forms a including a simple polaroid, or an electronically controlled crystal or liquid crystal polarization device. If the light rays 12 interact with the object being viewed 6, the polarization state of the light rays can be altered and the light can then pass through the analyzer and into the pupil. Since there are several mechanisms that can change the polarization state of light when interacting with object features, for example: reflections; anisotrophies; re-radiation; refraction; and defraction, sufficient light from the object can pass into the imaging optic to form an image. Since only light from the object features will pass through the analyzer and background light can be adjustably blocked, the system is effective for producing the dark-field effect.

The invention is particularly useful with translucent objects which provide for stronger polarization changing interactions. Optimizing the imaging of translucent specimens requires some form of transmitted light because translucent specimens have structures below their surface that are available for imaging, and transmitted light can reveal many of these features where reflected light will not. Thus illumination source light that is transmitted through objects provides a distinct improvement over systems using overhead or side reflected lighting schemes. In contrast to the methods of the art, the present invention provides for the ability to use low intensity on axis lighting to illuminate translucent objects, against a variably darkened background regardless of the objects position along the optical axis.

Matching the detectors dynamic range

Figure 6:
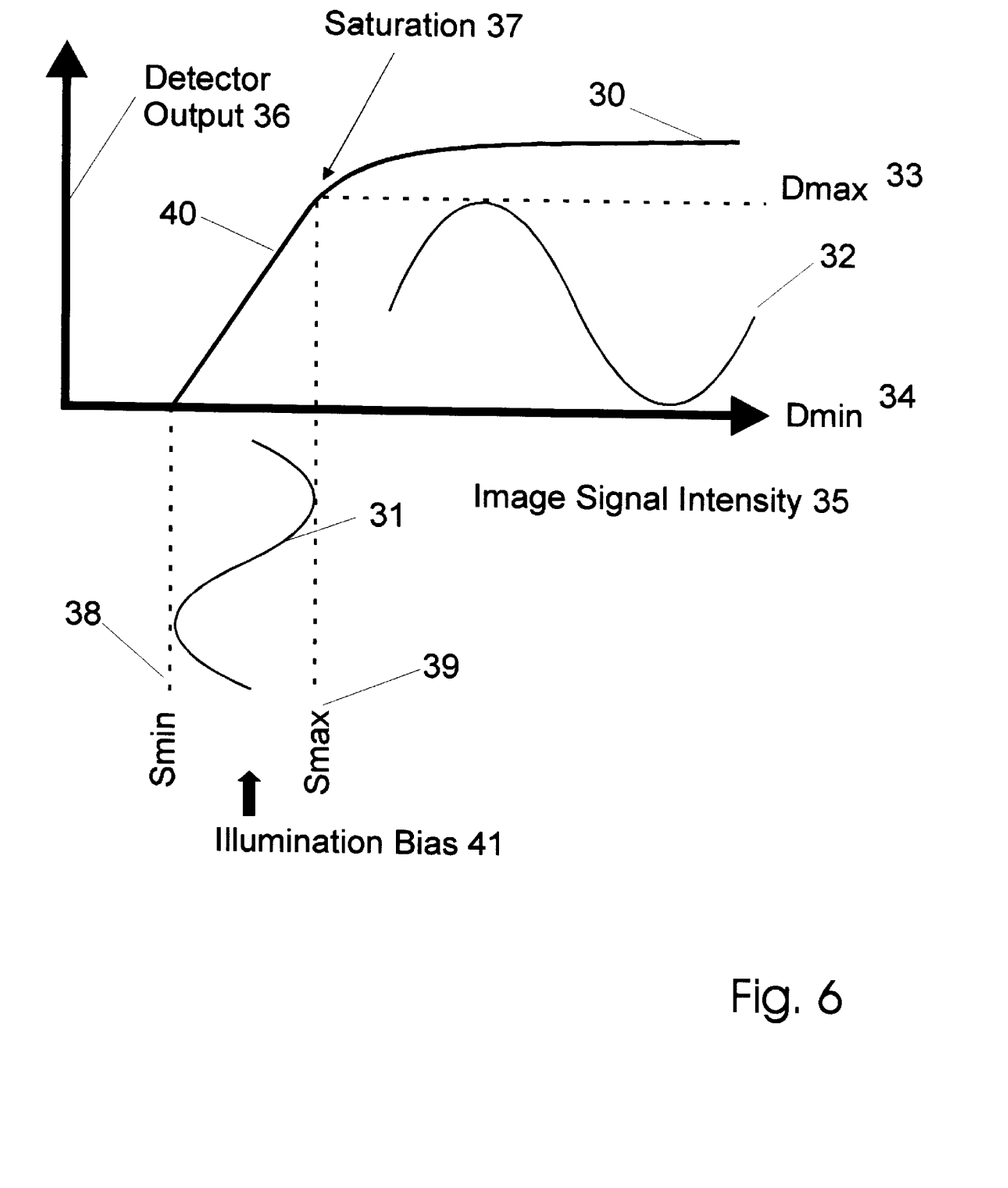
Figure 7:
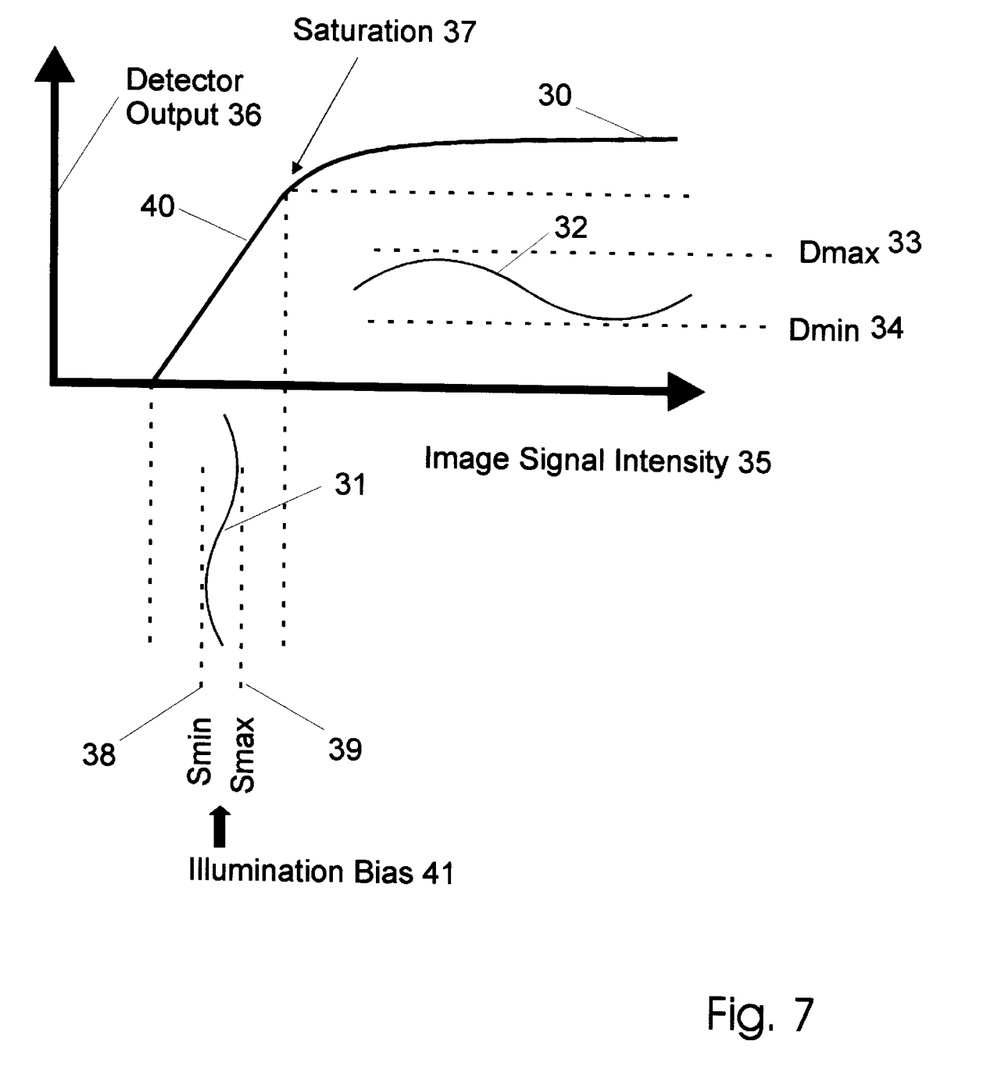
Figure 8:
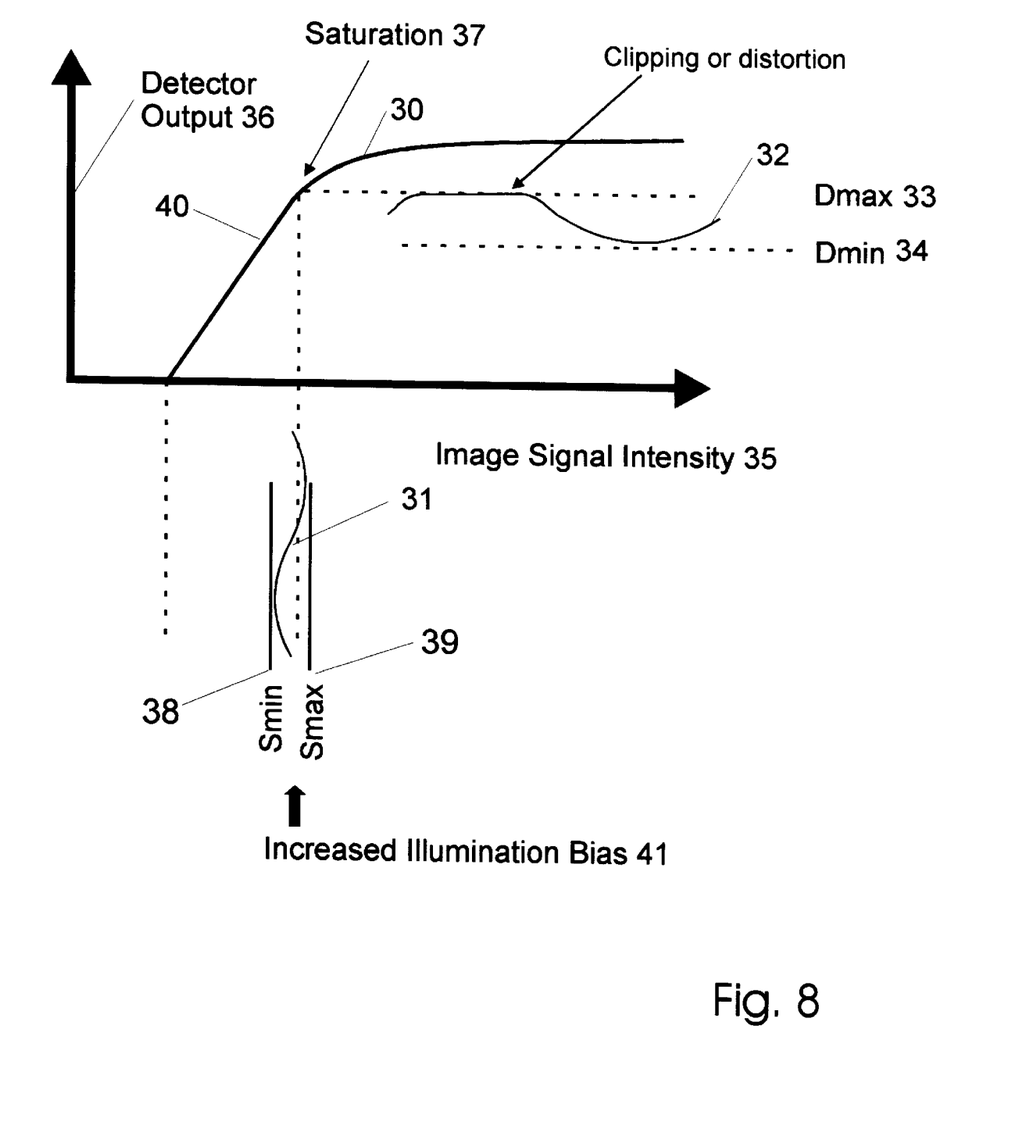
Figure 9:
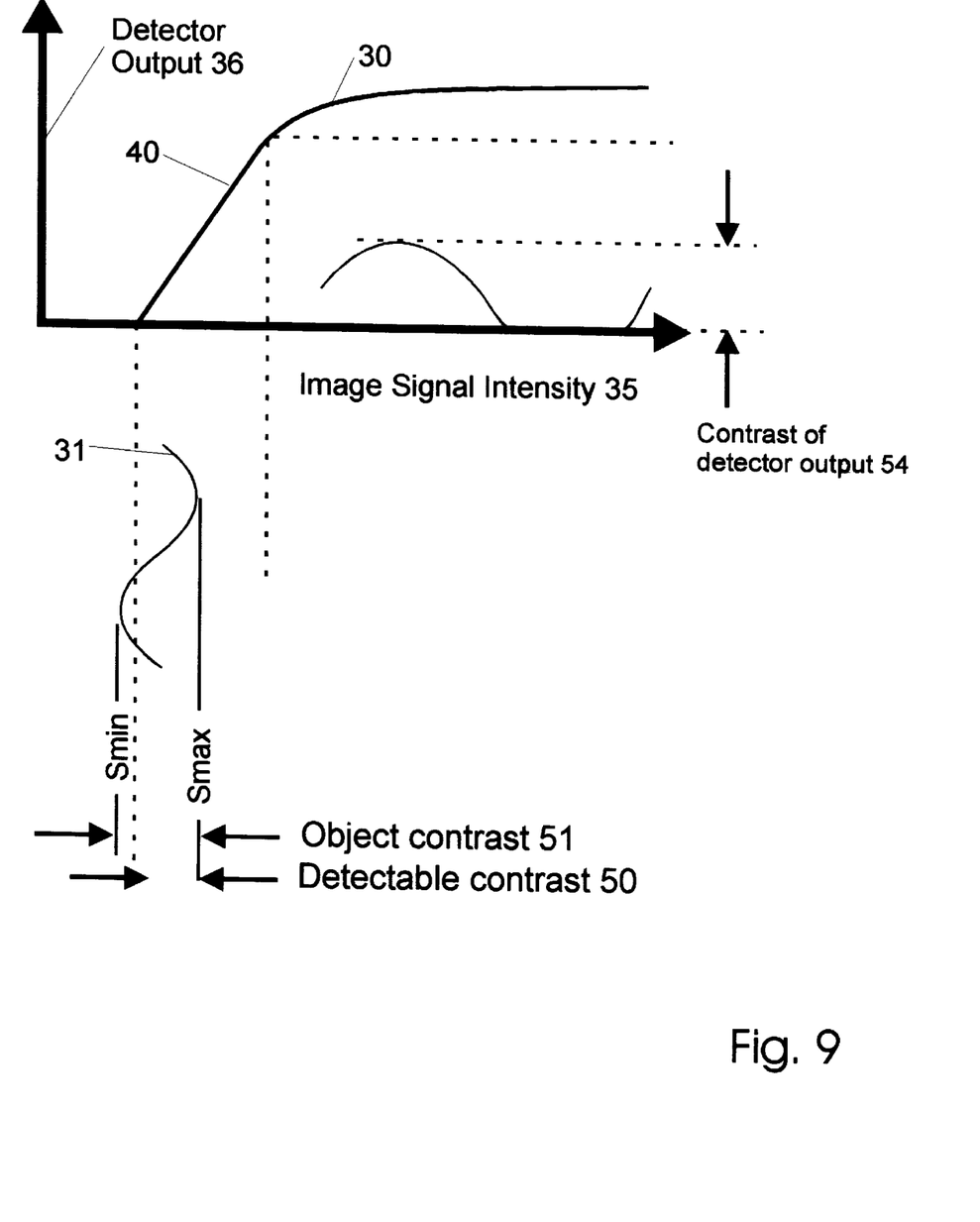
Figure 10:
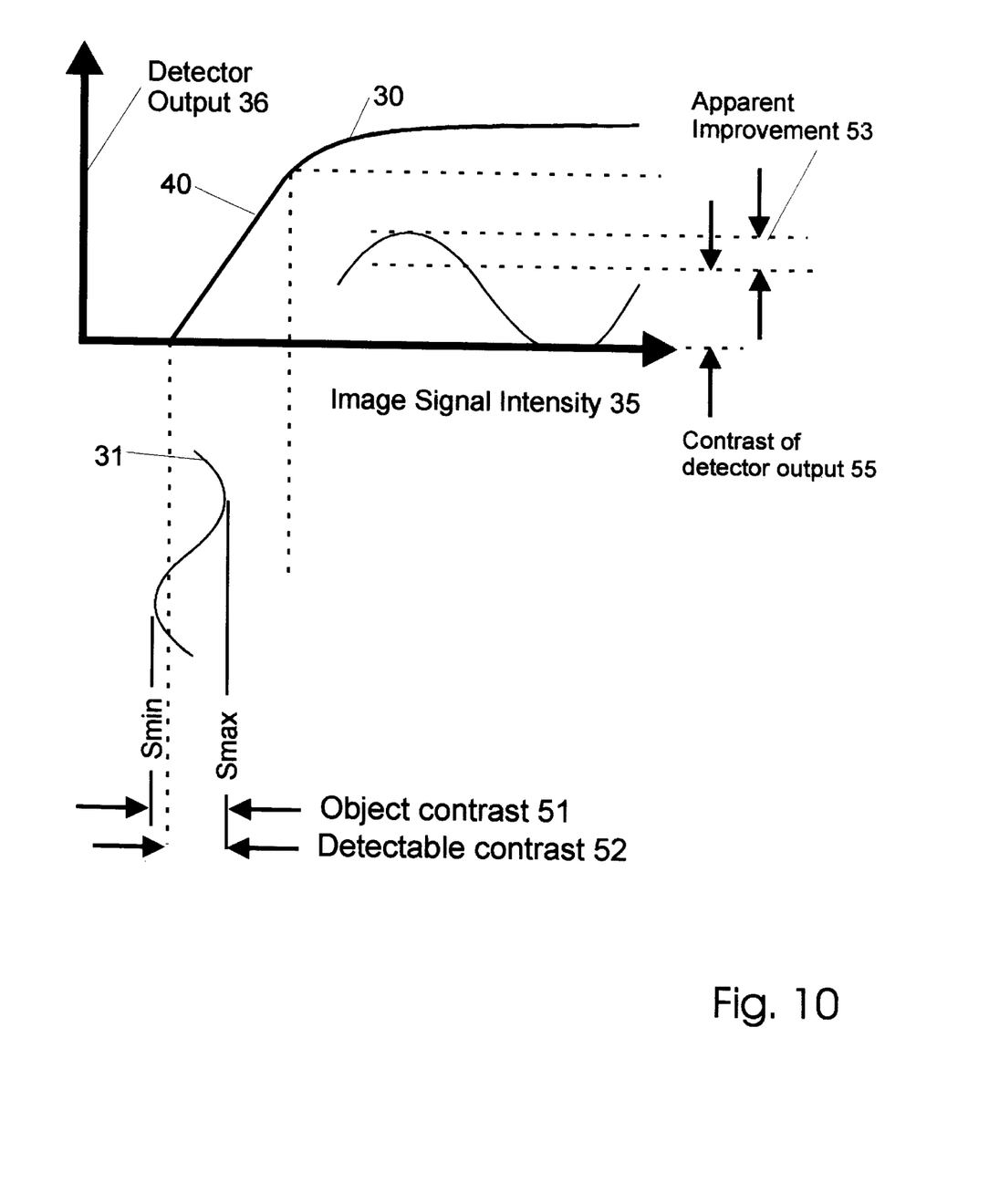

Image detectors including the human eye, photographic film, electronic imagers 14, and others, all have physical limitations and characteristics particular to each. To make best use of a particular detector one must consider those physical limits. An arbitrary detector response curve 30 for an arbitrary detector where Image Signal Intensity 35 is plotted versus Detector Output 36 is drawn in FIG. 6. The response curve has a linear region 40 and a saturation point 37 where thy response "rolls-off" at some maximum level. An example of a varying image signal intensity level 31 is mapped to an example detector output level 32. $S_{min}$ 38, is the minimum light level of the darkest image features. $S_{max}$ 39, is the maximum intensity level of the brightest image features. To make best advantage of a particular detector, one should attempt to make the darkest image features of the image correspond to the low end of the linear region 40 of the detector response curve, and the brightest image features correspond to the high end of the linear region as is shown in FIG. 6. In this way, the detector outputs can reach their extrema $D_{max}$ 33 and $D_{min}$ 34. The final image contrast will be maximized in this arrangement. If $S_{max}$ and $S_{min}$ are not aligned to the limits of the detector linear regions as is illustrated in FIG. 7, the final image will have unnecessarily limited contrast causing some image features to have less detail which could otherwise separate them from other image features. The maximum dynamic range of the detector is not being utilized in the example of FIG. 7. By simply increasing the illumination source intensity, one only increases the illumination bias level 41. The light level of the dark features increases as well as the light level of the bright features. This is shown in FIG. 8. One can not improve final image contrast by adjusting the level of the illumination source. Furthermore, the image intensity profile can be distorted if the illumination bias is increased to the point where the detector is saturated 37 and no longer produces a linear response An apparent improvement 53 occurs when an object whose dark features are below the low limit of the response curve is illuminated with a stronger source. This is due to the fact that the intensity difference between the brightest features and the darkest features of the object actually does increase as seen by the detector which cannot "see" the true level of the darkest features. FIGS. 9 and 10 show how the detectable contrast 50 of FIG. 9, increases to a larger detectable contrast 52 in FIG. 10. This is observed when the intensity of the illumination source is increased as is illustrated between the two FIGS. 9 and 10. Indeed, any final image produced by the detector in FIG. 10 has a contrast 55 that can yield an improvement over the severely clipped detector output contrast 54 of FIG. 9. The absolute contrast 51 of the object remains the same in both figures. In fact, in the best systems of the prior art, this is the case. Regardless of the intensity of the illumination source, the true object contrast 51 does not change. After the light level of the dimmest object features is brighter than the minimum detectable light level of the detector, the effect of apparent improved contrast is no longer observed. Further increases of the illumination source intensity can result in the clipping of FIG. 8.

Figure 11:
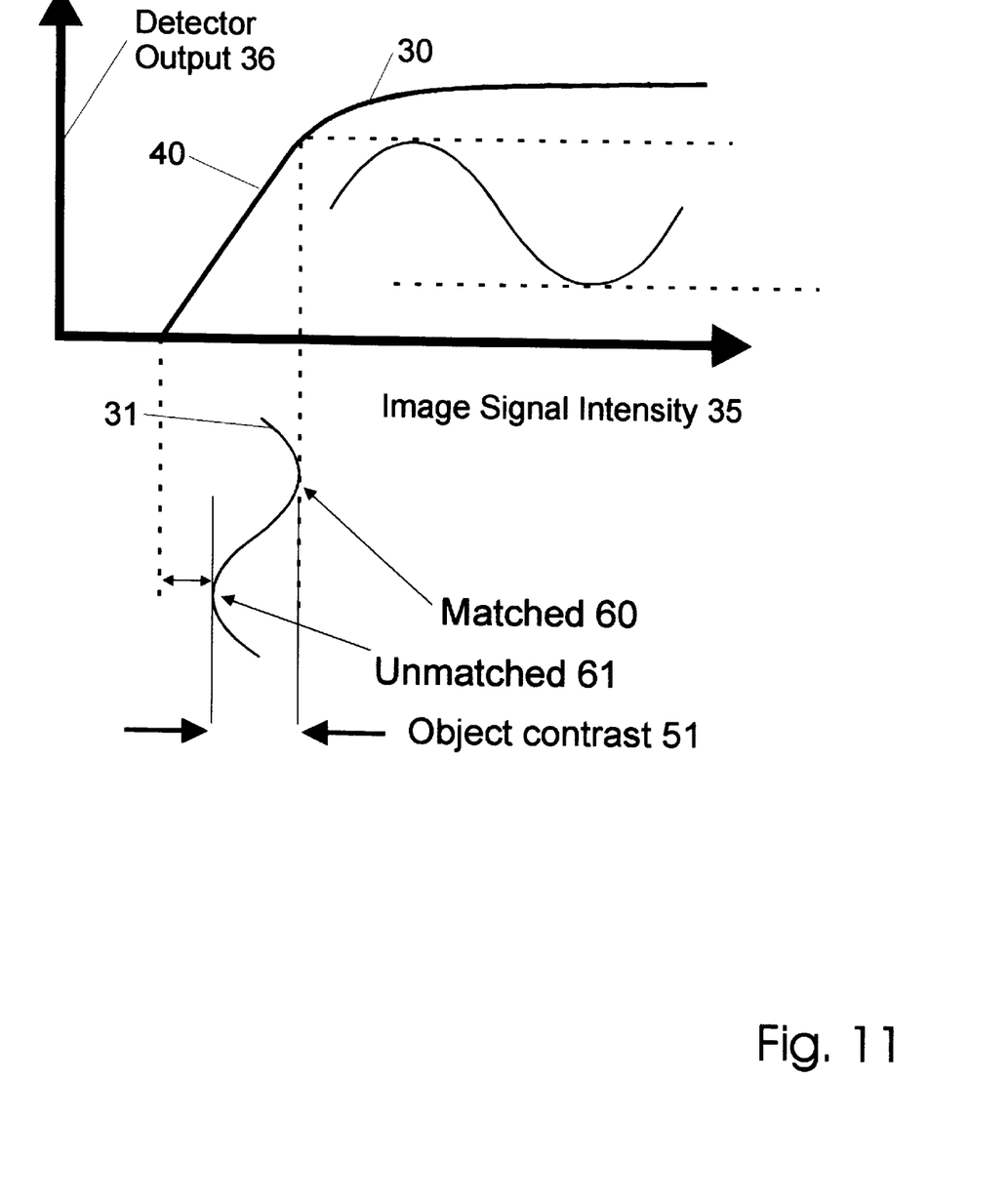

In versions of the instant invention, the illumination source intensity can be increased until the brightest features of the object are at a level that matches the top end of the detector linear region; indicated in FIG. 11 as "Matched 60". Note that the absolute object contrast 51 does not change with an increase of the source intensity. The light level of the dimmest object features is brighter than the minimum detectable levels and these levels remain "Unmatched 61" as is indicated in the figure.

Figure 12:
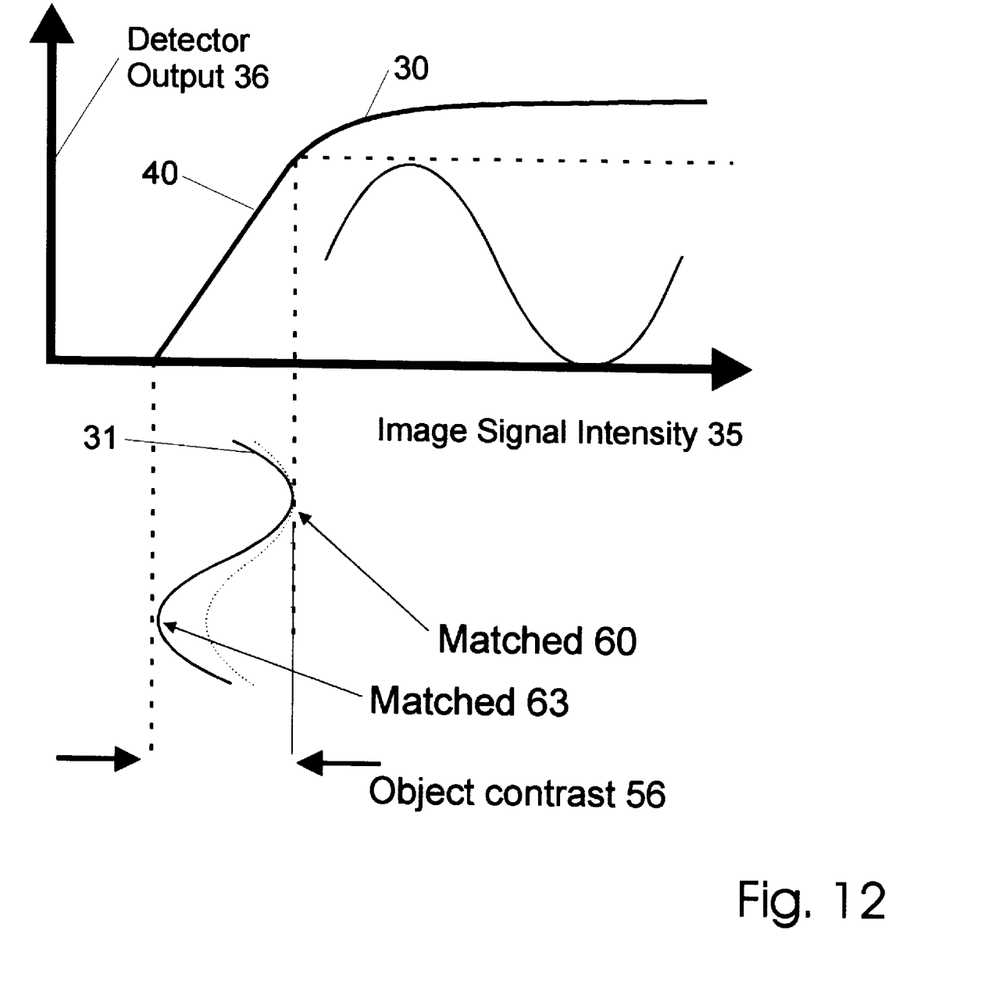

To change the lower light level of the object features one can use the variable dark-field approach of taught by this disclosure. A polarization analyzer between the object and the imaging optics can be rotated to extinguish the level of the light allowed to pass to the detector. In FIG. 12, the low light level is "Matched 63" to the low end of the linear response curve 40 of the detector. This has the spectacular effect of changing the absolute object contrast to match the dynamic range of the response curve of the particular detector. In many applications, the detectors being used can change frequently. For example, a person can be searching for a particular feature and prefer to view the image directly with the eye. After a desired feature is found, the image can be displayed to a group with a video system 14, 15, 16, that uses a camera as the image detector. The eye and the camera do not share response curves and the absolute object intensity should be adjusted. Further, should a photograph for later publication be desired, the photographic film will also have a different response curve and the invention allows one to optimize the object contrast to each detector quickly and easily without changes to the optical set-up.

As the art clearly teaches away from the invention: 1) the preferred method of dark-field illumination in the art does not use employ polarizers as they can require brighter sources than the oblique illumination method; 2) inventions of the art address increasing the source intensity, U.S. Pat. No. 4,906,083 and U.S. Pat. No. 4,634,240; 3) the art provides other means to increase image contrast without addressing adjustable contrast, U.S. Pat. No. 4,515,445, it is surprising that one could realize the benefits of the invention which on the face of it appear to be inferior. The inventors only noticed the spectacular improvement in final image contrast while experimenting with illumination levels near the non-linear regions of a CCD camera response curve. The non-linear regions of other detectors are more subtle and the effect may not have been as easily noticed when using those detectors.

In a first preferred embodiment of the invention, an optical imaging system illumination apparatus for providing a variable dark-field image wherein features of an object appear to be light and the background appears to be dark and whereby the light from said object of the image passes freely through a optical discriminator and into a pupil and light from the source, particularly a source appearing in the field-of-view of the imaging optics, is blocked at the discriminator optic and does not pass into the pupil of the imaging optics; the apparatus comprising: a) a illumination source, which produces polarized light that propagates as a beam substantially along; b) an optical axis, which defines an axis of symmetry for the cylindrically symmetric optics which include the special case of spherically symmetric optics, whereby the beam of light from said light source propagates away from the light source along the axis; c) an object volume, which is symmetric about said optical axis having a peripheries defined by the limits of the light source and the limits of the field of view of; d),imaging optics, which produce an image in an image volume of an object in said object volume which has a light field emanating therefrom; e) a pupil aperture, symmetric about the optic axis between the object volume and the imaging optics; f) a polarization analyzer optic, symmetric about the optic axis between the object volume and the imaging optics; and g) a detector, in the image volume of said imaging optics, is provided.

A variable intensity light is positioned on axis with imaging optics. If the light from the source is not already polarized, then a polarizer is placed after the source in the optical path of the source light. The light from the source that is polarized propagates along the optic axis, past or through or on, the object being viewed, and toward the imaging optics pupil. When the light interacts with the object by way of refractions, reflections, birefringence, re-radiation, etc., the polarization state of the illumination light can be changed. An optical element such as a polarization analyzer that can discriminate against light of a particular polarization state. A polarization analyzer can variably control the contrast between the object features and the background to optimize the input to the imaging optics detector's dynamic range. For special object surfaces, it may be desirable to use a quarter-wave plate to yield circularly polarized light which would then make the illumination independent of surface plane effects. A second wave plate can be used between the object and the imaging optics for the analyzer function. It is important to note that the source is not required to have a polarizer. Some sources naturally generate polarized light such as a laser. The output of a laser is linearly polarized and does not have a polarizer.

In another preferred embodiment of the invention, the polarization analyzer can be an electronically controlled liquid crystal. Conventional analyzers may be rotated about their symmetry axis to change the extinction of the light incident thereon. It may be useful to have a more precise control and to avoid disturbing the optical system. To produce this system, an analyzer can be a voltage controlled liquid crystal device.

In accordance with each of the preferred embodiments of the invention, there is provided an apparatus for and method of dark-field illumination system. It will be appreciated that each of the embodiments described include both an apparatus and method and that the apparatus and method of one preferred embodiment may be different than the apparatus and method of another embodiment.

Although the present invention has been described in considerable detail with reference to certain preferred versions thereof, other versions are possible. Therefore, the spirit and scope of the appended claims should not be limited to the description of the preferred versions contained herein.

We claim:

1. An optical imaging system illumination apparatus for providing a variable dark-field image wherein features of an object appear to be light and a background appears to be dark and whereby the light from said object of the image passes freely through an optical discriminator and into a pupil and light from a source, said source appearing in a field-of-view of imaging optics, is blocked at the optical discriminator and does not pass into the pupil of the imaging optics; the apparatus comprising:
   a) an illumination source, which produces polarized light that propagates as a beam substantially along an optic axis;
   b) the optical axis, which defines an axis of symmetry for cylindrically symmetric optics which include special cases of spherically symmetric optics, whereby a beam of light from said light source propagates away from a light source along the axis;
   c) an object volume, which is symmetric about said optical axis having peripheries defined by extent of the beam of light and the limits of the field of view of;
   d) imaging optics, which produce an image in an image volume of an object in said object volume which has a light field emanating therefrom;
   e) a pupil aperture, symmetric about the optic axis between the object volume and the imaging optics;
   f) the optical discriminator, symmetric about the optic axis between the object volume and the imaging optics; and g) a detector, in the image volume of said imaging optics.

2. An optical imaging illumination apparatus of claim 1, said illumination source being a laser where—the—light output of the laser is linearly polarized light.

3. An optical imaging illumination apparatus of claim 1, said illumination source is a conventional source such as a incandescent, fluorescent, or arc discharge source, in combination with a polarizing means whereby the output of said light source is linearly polarized light.

4. An optical imaging illumination apparatus of claim 1, where the illumination source is a—combo—combination of a light source, waveplate, and polarizer—and—whereby light output is circularly polarized light.

5. An optical imaging illumination apparatus of claim 1, where the illumination source also has a liquid crystal and a voltage controlled means to rotate the liquid crystal for electronically variable system.

6. A method of illuminating an object being examined by an optical imaging system whereby object contrast is adjustable to correspond to linear response limits of an image detector comprising the steps:
   a) increasing intensity of the illumination source which illuminates the object with polarized light whereby the intensity of brightest features of the object become a level near the detector response saturation point; and
   b) reducing the intensity level of the darkest features of the object to levels near the detector's minimum response level by adjusting a polarizer to discriminate against the polarization state of the source illumination, whereby the object contrast more closely matches the dynamic range of the detector and thereby improves the image contrast produced by the detector.

7. An optical imaging system illumination apparatus for providing a variable dark-field image wherein features of an object appear to be light and a background appears to be dark and whereby the light from said object of the image passes freely through an optical discriminator and into a pupil and light from a source, particularly a source appearing in a field-of-view of imaging optics, is blocked at the optical discriminator and does not pass into the pupil of the imaging optics; the apparatus comprising:
   a) an illumination source, which produces polarized light that propagates as a beam substantially along an optic axis thereby illuminating the object and a background field, whereby light incident on the object has a tendency to change its polarization and light incident in the field tends to substantially maintain its polarization;
   b) the optical axis, which defines an axis of symmetry for cylindrically symmetric optics which include special cases of spherically symmetric optics, whereby a beam of light from said light source propagates away from a light source along the axis;
   c) an object volume, which is symmetric about said optical axis having a peripheries defined by extent of the beam of light and the limits of the field of view of;
   d) imaging optics, which produce an image in an image volume of an object in said object volume which has a light field emanating therefrom;
   e) a pupil aperture, symmetric about the optic axis between the object volume and the imaging optics;
   f) the optical discriminator, symmetric about the optic axis between the object volume and the imaging optics oriented so that it tends to block light from the background field and pass light from the object; and
   g) a detector, in the image volume of said imaging optics.

* * * * *